United States Patent [19]

Cottingham

[11] 3,887,319
[45] June 3, 1975

[54] APPARATUS FOR THE EXTRUSION OF ULTRA HIGH MOLECULAR WEIGHT POLYMERIC RESINS

[75] Inventor: Robert A. Cottingham, York, Pa.

[73] Assignee: The Polymer Corporation, Reading, Pa.

[22] Filed: Dec. 8, 1972

[21] Appl. No.: 313,233

[52] U.S. Cl.............................. 425/379 R; 425/207
[51] Int. Cl............................................. B29f 3/08
[58] Field of Search .......... 425/378, 379, 207, 376, 425/461; 264/176 R

[56] References Cited
UNITED STATES PATENTS

| | | | |
|---|---|---|---|
| 2,747,224 | 5/1956 | Koch et al. | 425/378 X |
| 2,770,841 | 11/1956 | Cooke et al. | 425/379 X |
| 3,284,372 | 11/1966 | Bailey | 425/379 X |
| 3,354,501 | 11/1967 | Bachman et al. | 425/378 X |
| 3,385,917 | 5/1968 | Breukink et al. | 425/379 X |
| 3,461,490 | 8/1969 | Cottingham | 425/379 X |

Primary Examiner—R. Spencer Annear
Assistant Examiner—Mark Rosenbaum
Attorney, Agent, or Firm—Ralph S. Turoff

[57] ABSTRACT

Apparatus and method for the extrusion of ultra-high moleular weight polymeric material wherein measured charges of such material in particulate form are delivered successively to a precompression chamber and then advanced continuously to a preheating chamber by reciprocating ram structure, the material then being simultaneously compacted and forced into the entrance of an elongated die, the temperature conditions within the die being carefully controlled to provide a temperature which will insure the formation of a homogeneous mass at the inlet end and a cooling gradient extending to the die exit whereby the extrudate is cooled to a self-sustaining temperature at the die orifice.

7 Claims, 8 Drawing Figures

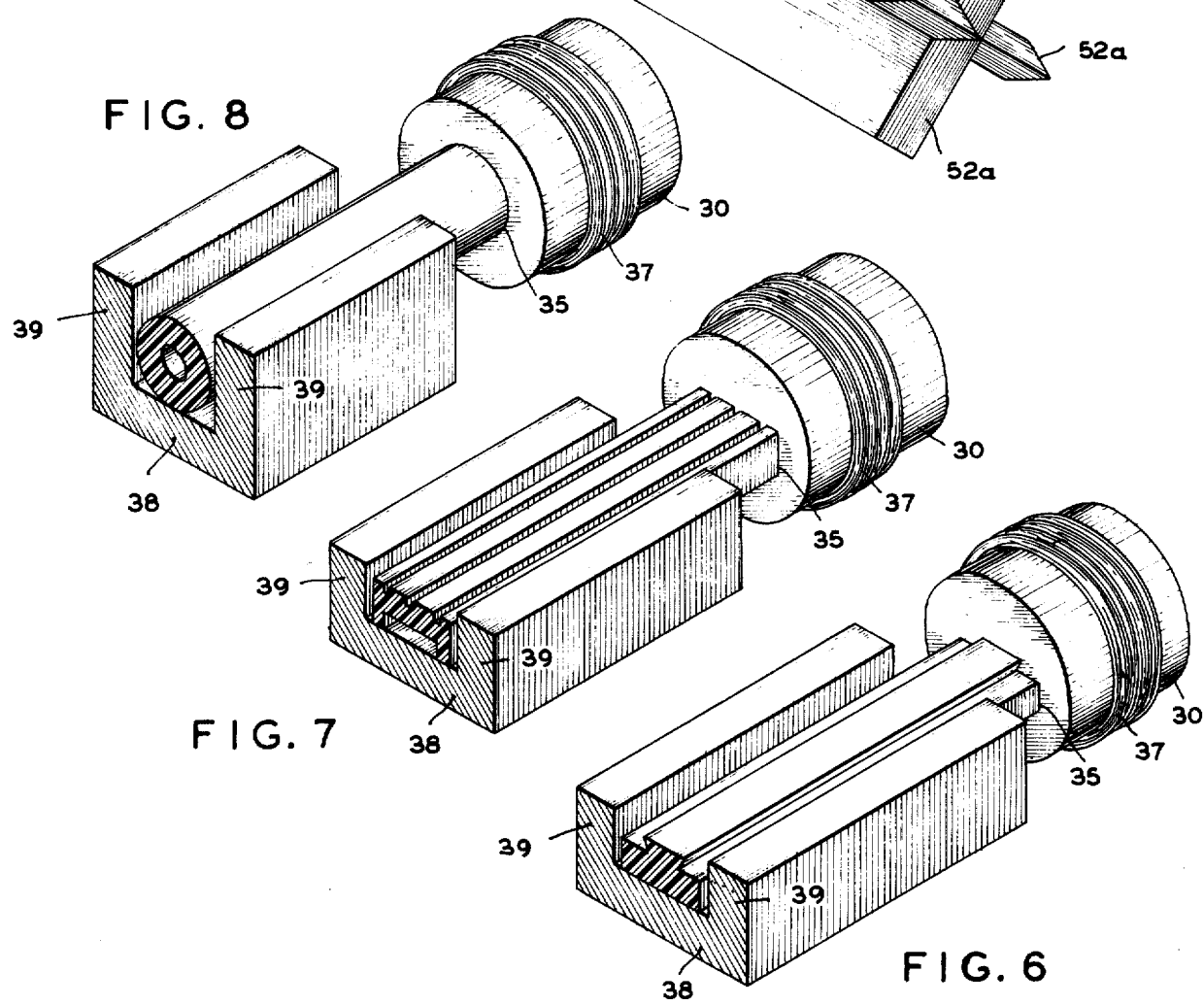

APPARATUS FOR THE EXTRUSION OF ULTRA HIGH MOLECULAR WEIGHT POLYMERIC RESINS

This invention relates to novel techniques and novel apparatus for the continuous extrusion of articles and specific shapes from polymeric materials and ore particularly to such extrusions produced from ultrahigh molecular weight (UHMW) polymers.

The continuous extrusion of specific shapes from oolyethylene resin, which has a molecular weight on the order of 50,000 is well known and presents no serious problems. However, such extrusions from UHMW high density polyethylene resins, which have a molecular weight range between 2.5 and 6 million, are unkown in this art.

Applicant has found that such UHMW high density polyethylene resins can be extruded continuously in such shapes, or profiles, as sheets, boards, rods, tubes and the like, and that such extrusions can be machined, or otherwise processed, with particular ease on conventional equipment used for the fabrication of wood or metallic articles.

Applicant has discovered that mixture of UHMW polyethylene resins of differening molecular weights are preferable to the utilization of a UHMW resin of uniform molecular weight. Thus, with a mixture of substantially equal pats of UHMW resin, one part having a weight of 1 million while the other part has a molecular weight of 6 million, some poor material will be included resulting in the production of extrusions leaving something to be desired. With a mixture of UHMW resins having respective molecular weights of 2.5 million and 4 million, excellent end products were produced. With a mixture of resin particles, each part of which approached a molecular weight of 3.5 million, optimum results were obtained.

From this it follows that the closer the range of the respective molecular weights of the mixture, the better the extruded product.

Slip characteristics are essential to the present novel process and, to this end, a suitable additive (such as zinc stearate, or the like) is employed. Additionally, use of an anti-oxidant is essential.

UHMW resins of the character with which we here are concerned, particularly with extrusion pressures on the order of 50,000 p.s.i., are sensitive to shear and temperpature. Further, where degradation will occcur at 500°F, dwell time becomes critical. Where temperatures are lowered, to permit a longer dwell time, uneconomical results are obtained.

A particularly sitable UHMW polyethylene resin for present puproses will have a molecular weight on the order of 3.5 million and an intrinsic velocity of 20. Resins of this character have been found to have a softening point at 136°C. and, when the temperatue is elevated to 350°F., the resin will assume putty-like characteristics.

It is a major object of the present invention to provide a novel method and apparatus for the continuous extrusion of UHMW High density polyethylene resins in specific shapes or profiles, such extrusions being in the form of continuous rods, tubes, or the like, and where such extruded products may have any cross-sectional configuration desired, dependent only upon the die structure employed.

In the novel process of the present invention, particles of UHMW high density resin having a suitable slip agent and anti-oxidant uniformly dispersed therein, are delivered by gravity to a compression chamber from a suitable hopper or other source of supply. A reciproacating ram, or the like, is provided fro compacting the charge of polymeric particles which have been delivered to the compression chamber and advancing the compacted charge to a preheating chamber loacted immediately adjacent the exit end of the compression chamber. Desirably, the compression chamber will be cooled and maintained at a temperature on the order of 65°F.

With continued reciprocation of the ram, which operates at a pressure on the order of 50,000 p.s.i., successive charges of polymeric material are compacted, delivered to the preheating chamber and advanced thereof. The exit end of the preheating chamber is in direct communication with the inlet manifold of the extrusion die and the extrudate will isssue from the die orifice in the form of a continuous extrusion.

It will be understood that preheating temperatures are critical and that the preheating chamber must be maintained at an elevated temperature on the order of 250° to 425°F., with an optimum temperature of 420°F. At this temperature, which approaches the softening point of the UHMW particles, and by reason of back pressure built up in the preheating chamber and the die manifold, the extrudate will have become a homogeneous mass having putty-like characteristics, and a complete bond will have been created between the successive charges of polymeric particles.

It is essential that the die be maintained at a temperature less than that of the preheating chamber and a range of from 300° to 350°F. has been found to be appropriate for such purposes. For optimum results, a die temperature on the order of 300° to 350°F. is required; however, extreme care must be exercised to insure that the preheater tempeature will not exceed the degradation point of the UHMW polymer which is slightly in excess of 500°F.

The ratio between the length of the preheating chamber to that of the ram stroke should be on the order of 2:1. Thus, with a ram stroke or movement of 3½ inches, the extent of the preheating chamber should approximate 6 to 7 inches. With such a ratio, and with the ram reciprocating at a rate of two strokes per minute, the linear rate of movement of the extruded product will be 5 inches per minute.

The ratio betwen the dimensions of the preheating chamber and that of the die profile also are critical and this should be on the order of 3:1, consideration being given to the respective diameters.

As the finished product (extrudate) exits through the die orifice, the extrusion travels through a cooling zone or chamber within which the temperature is reduced gradually to approximately 200°F. At this temperature the finished product si completely self-supporting and the take-off is accomplished at ambient or atmospheric temperatures. A highly satisfactory form of take-off structure has been found to be in the nature of a horizontally disposed trough, or the like, including bottom and side wall surfaces open at the top to the atmosphere. Such an arrangement will insure against any droop in the length of the moving extruded product as well as any disadvantageous deviation from the true axial plane of the extrusion apparatus. Suitable materials for such take-off structure, and these could include wood, must have heat absorbing characteristics and the ability to withstand the initial (approximate) 200°F. temperature of the extrusion which, it will be understood, cools with particular rapidity as it travels in frictional contact with the take-off structure.

As stated hereabove, the material or extrudate undergoes a 3:1 reduction in diameter or cross section as it travels from the preheater to the die. This is essential to achieve the required continuity of flow. The factors which contribute to the ciriticality of this rate of reduction in cross section arise from the fact that with each stroke (forward movement) of the ram the entire charge of polymeric material being compressed and advanced does not enter the preheating section; thus the rearward extremity of the load functions as a compacted plug to prevent back flow. Without complete continuity of flow the extrusion would assume segmental characteristics with the interfaces between successive charges.

Increase of this reduction (3:1) ratio will result in the introduction of excessive sheer and thus affect adversely the extrusion being produced. In the present novel process the intrinsic viscosity (IV) of the UHMW polymer now degrades (with permissible limits) from 17 IV 15 IV. Assuming that a starting material with higher IV was employed, a reduction ratio greater than 3:1 becomes available. However, an increase in this reduction ratio would necessitate a greater speed or rate of movement of the extrudate through the die and this would result in problems in achieving adequate cooling prior to the extrusion passing through the die orifice.

Under optimum conditions, the temperature of the die decreases from a maximum of on the order of 400°F. at the inlet end immediately adjacent to the exit extremity of the preheater) to a temperature on the oreder of 250°F. at the die orifice. It is essential that this temperature gradient be maintained within the die; otherwise, the extrudate would surrender its heat (built up in the preheating chamber) so rapidly as to result in the solidification of the polymeric material within the die.

Additonally, if the temperature at the die orifice is too high, the extrusion will be too soft and will have to be carried a greater distance beyond the die before it will become cool enough for cutting into appropriate lengths (as may be required) and other handling. Conversely, if the temperature at the die orifice is too cool, as the extrusion emerges and no longer is subjected to pressure, there will be severe tendency to bilstering since the interior portion of the finished product will be substantially hotter than the surrounding or exterior portion.

It also must be understood that the temperatures referred to hereabove are die temperatures as distinguished from material temperatures and that these die temperatures will have direct relationship to, and depend upon, the cross section of the profile being extruded. The foregoing objects thereof, will be readily apparent from the following description, taken in connection with the accompanying drawings, wherein:

FIG. 5 is a perspective view, on an enlarged scale, illustrating the detached spreader assemly;

FIG. 6 is a perspective view illustrating the outlet extremity of an extrusion die designed for the production of a track element with a length thereof being received upon the take-off trough;

Figure 1:
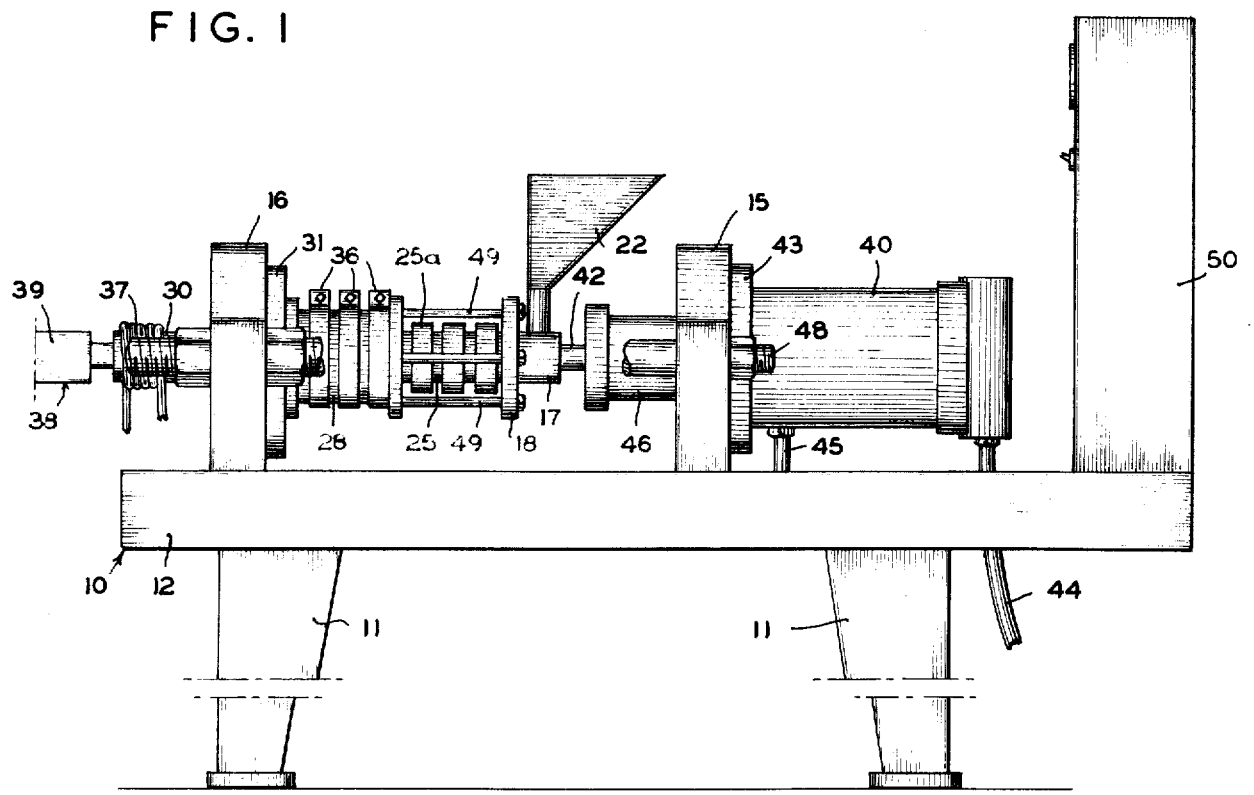
FIG. 1 is a side elevational view of novel extrusion apparatus embodying the present invention for the continuous extrusion of lengths of UHMW high density polymeric resins, the profile thereof being determined by the specific die employed.
Figure 2:
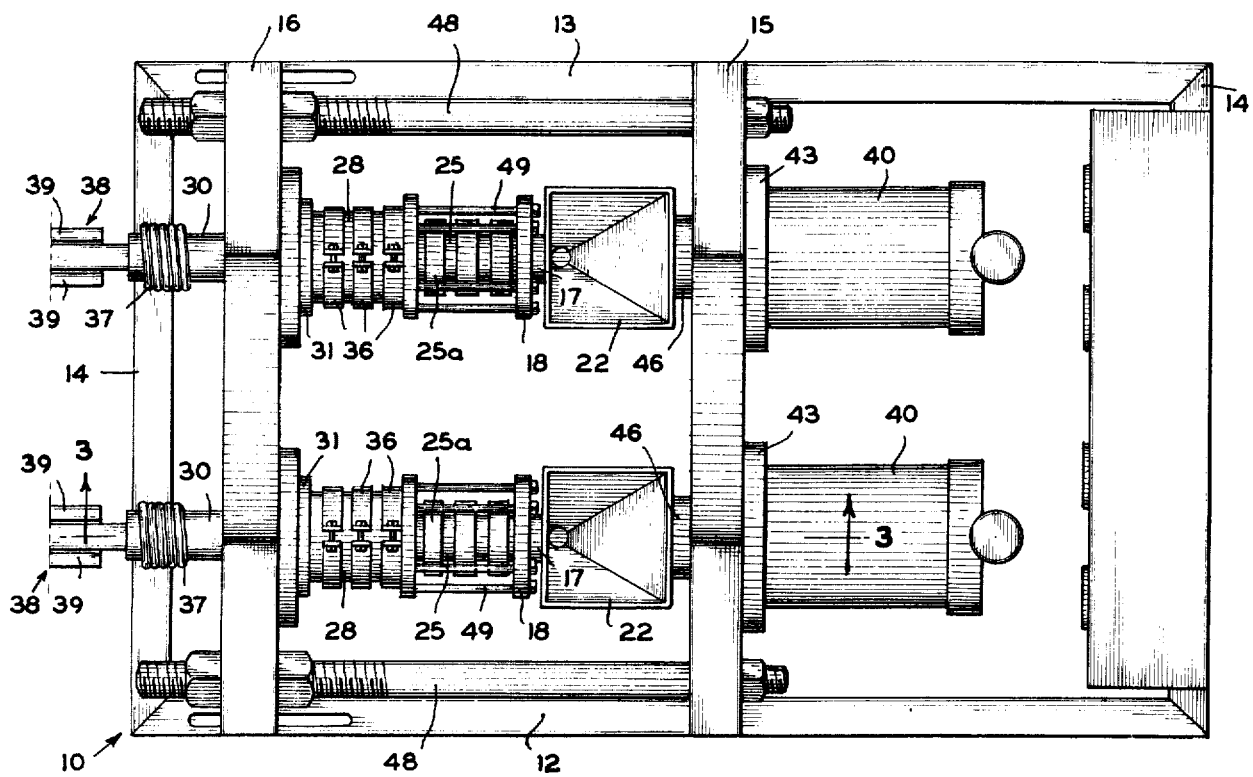
FIG. 2 is a top plan view of the novel extrusion apparatus of FIG. 1.

FIG. 7 is a perspective view illustrating the outlet extremity of a modified extrusion die designed for the production of a skid element with a length thereof being received upon the take-off trough; and FIG. 8 is a perspective view illustrating the outlet extremity of a further modified extrusion die designed for the production of a tubular element with a length thereof being received upon the take-off trough.

As shown in the drawings, The novel extrusion apparatus of the present invention includes a suitable base or frame 10 mounted upon appropriate standards or legs 11. The base is substantially rectangular and includes a pair of longitudinally disposed space beams 12 and 13 joined at the extremities thereof by transverse beams 14. A pair of transversely disposed mounting flanges 15 and 16 are secured to the side beams 12 and 13 and extend upwardly therefrom, these mounting flanges supporting the various elements of the extruder as will be described in detail hereafter.

While a single extruder may be utilized, the embodiment of the invention illustrated discloses a twin arrangement including a pair of extruders whereby the productive potential of the apparatus may be doubled. Where separate controls are provided for each extruder, either one (or both) may be used as desired.

Each extruder includes a preferably cylindrical member 17 mounted within an enlarged annular element 18 and having a centrally located bore 19 extending therethrough, this bore defining a precompression chamber 20. The upper surface of the member 17 is provided with a vertically disposed passage 21 which communicates with the bore 19 for the reception of the lower extremity of a hopper or the like 22 whereby particles of UHMW Polyolefin are delivered to the precompression chamber or bore 19 in metered quantities.

The cylindrical member 17 extends through the ring-like englarged flange portion 18 and, to provide for a secure assembly, preferably is provided with an outwardly tapered conical portion 23 which seats within a complementarily conformed recess provided in the flange 18. Further, the outer vertical face of the conical portion 23 includes an integral annular boss 24 which surrounds the axial bore 19 for a purpose to be described more fully hereafter.

A substantially cylindrical tubular member 25 constituting a pre-heater is located in abutting relationship with respect to the outer face of the mounting ring 18 of the precompression chamber 20 and the preheater is provided with a centrally located axial bore 26 extending therethrough. The bore 26 constitutes a compression chamber and is complementary to the bore 19 of the pre-compression chamber and is located in direct alignment therewith. Desirably, and as shown more particularly in FIG. 3 of the drawings, the juxtaposed face of the tubular member 25 is provided with a complementarily conformed recess 27 within which the annular boss 24 of the member 17 is received, this structural relationship providing for a secure assembly of adjacent elements and accurate alignment of the precompression and preheating chambers 20 and 26, respectively.

Suitable means is provided for maintaining the temperature of the preheater and internally located chamber, at a sutiably elevated temperature (on the order of 420°F. ) and such means may be in the form of electrically controlled band-type heating elements 25a.

The extrusion die per se 28 is positioned immediately adjacent the exit extremity of the preheating chamber and includes an enlarged annular flange portion the juxtaposed vertical face of which preferably is provided with a centrally located recess 29 within which the outer extremity of the tubular member 25 is received. The die body includes an elongated outer portions 30 of reduced diameter which extends through a die mounting ring 31 and an aperture 32 provided in the transverse flange 16.

Suitable means is provided for securing the die mounting ring 31 to the adjacent vertical face of transverse flange 16. Such means may include fastening elements such as bolts or the like, or the die mounting ring may be welded directly to the face of the flange. Further, the flange 16 desirably is secured or attached to the longitudinal beams 13 and 14 of the supporting base or frame 10 in such a manner as to permit longitudinal adjustment whereby die bodies of varying lengths may be used selectively in the apparatus of the present invention.

The die body is provided with an axial passageway 33 extending longituidinally therethrough and through which the UHMW extrudate travels, this passageway including a tapered conical entrance 34, initially complementary to the area and configuration of the mating exit of the compression chamber 26 and a discharge orifice 35 which, together with the remainder of the die passageway, except for the conical inlet, will have a profile in strict accordance with the end product being produced. The ratio between the area (diameter) of the preheating chamber which (it will be understood) also functions as a pre-heating zone and that of the profile of the extrudate is critical and must be on the order of 3:1.

Since the temperature of the extrudate must be controlled carefully as it travels through the die passageway, suitable heating means are required for this purpose. Electrically controlled band-type heating elements 36 and cooling coils 37 are illustrated and thermostatic or other means (not shown) are utilized to insure that the temperature of the extrudate, which leaves the preheating chamber and enters the die passageway at a temperature of the order of 420°F., will be reduced gradually as it passes through the initial portion of the die body to a temperature on the order of 250°F. and will be further cooled to a temperature on the order of 200°F. as the extrudate exits through the die discharge orifice and enters the ambient atmosphere.

Suitable supporting and take-off means is provided for the reception of the continuous length of extrudate as it leaves the extrusion orifice since it is essential that any deivation from the precise horizontal plane and longitudinal axis of the extrusion die be avoided. A particularly satisfactory and economical form of such is a wood trough-like structure 38 having vertical walls 39 defining a groove of a width slightly in excess of the width of the finished product. Supporting means is provided to maintain the take-off trough in a true horizontal prosition with the bottom wall of the trough or groove in direct alignment with the bottom wall surface of the die orifice. The continuous length of extrudate moves frictionally within the trough and it has been found that the retained heat within the extrudate has little effect on the wood supporing and guiding surface and is readily dissipated. It will be understood that, in a continuous operation, appropriate lengths of the finished product may be severed, and removed for storing, stacking, or other purposes, as desired by a sawing or cutting operation.

Suitable means is provided for the step-by-step advancement of the successive charges of UHMW polymeric material which are dleivered to the precompression chamber and a preferred embodiment thereof includes a hydraulic cylinder 40 within which a reciprocating piston 41 is mounted, the forward face of this piston carrying an elongated ram 42. The hydraulic cylinder 40 is mounted within an annular supporting member 43 which is fixedly secured to the adjacent vertical face of the transverse flange 15 by any suitable means such as bolts or the like, or the hydraulic cylinder mounting means may be welded directly to the face of the transverse flange. Hydraulic conduits 44 and 45 are provided for the introduction of fluid into the cylinder 40 to effect reciprocation of the piston 41 and ram 42 as is well known in this and related arts.

Figure 3:
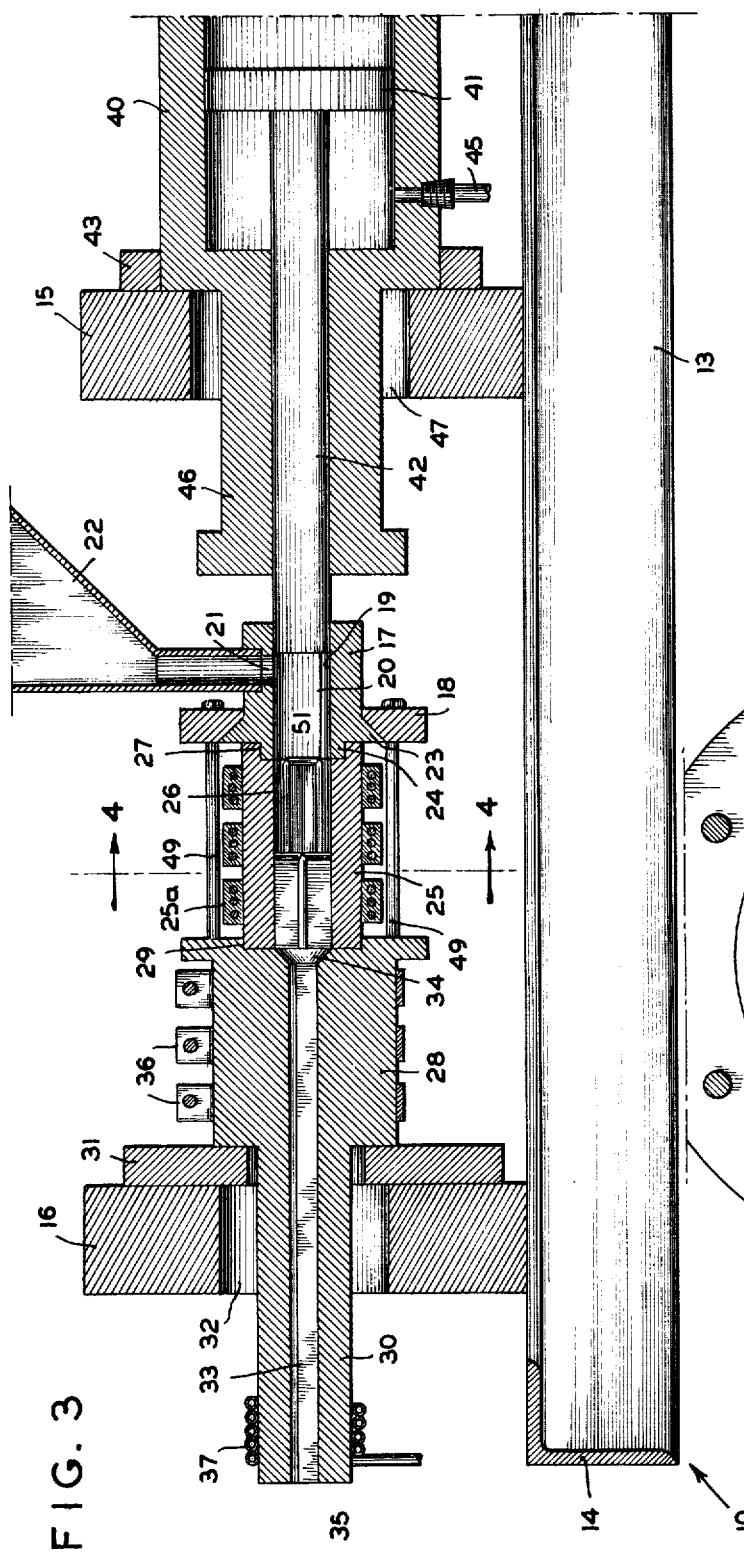
FIG. 3 is a longitudinal sectional view taken on the line 2—2 of FIG. 2, on an enlarged scale for purposes of greater clarity.
Figure 4:
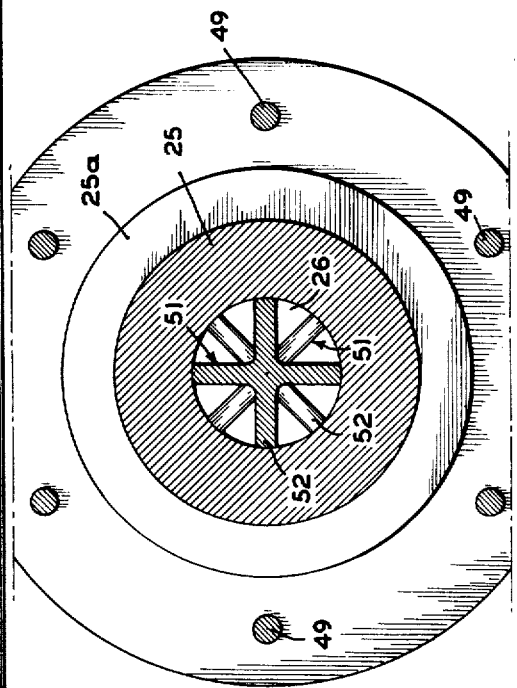
FIG. 4 is a transverse sectional view, on an enlarged scale, through the preheating cylinder, taken on the line 4—4 of FIG. 3.

As shown in the drawings, and particular reference is had to FIG. 3 thereof, the hydraulic cylinder 40 includes a forwardly extending portion 46 of reduced diameter which extends through the aperture 47 in the transverse flange 15. The diameter of the ram 42 is complementary to that of the precompression chamber 20 within which the forward extremity of the ram is received and reciprocates and, in assembled relationship with the hydraulic piston and ram in fully retracted position, the inner extremity or face of the ram will be located in substantially direct alignment with the adjacent wall surface of the vertically disposed aperture 21 through which the successive charges of UHMW polymeric material are fed.

To provide for the secure mounting of the components referred to hereabove, after assembly thereof, tie rods 48 are provided. These extend between the transverse mounting flanges 15 and 16 and, since the flange 16 (as pointed out hereabove) is longitudinally adjustable with respect to the side beams 12 and 13 of the supporting frame 10, assembled adjustment is relatively simple with complete assurance as to the effective rigidity of the extrusion appartaus and ability to withstand the vibratory influeneces arising out of operative conditions.

Similarly, to insure rigid and fluid-proof association between the aligned precompression chamber, the preheating chamber, and the die body, a plurality of tie rods 49 are utilized, the forward extremity of each tie rod having threaded engagement with the end flange on the die body 28 while the free threaded extremity of each tie rod 49 extends through the mounting ring 18 with locking nuts being provided to complete the assembly.

As electrical panel, illustrated conventionally at 50, also is provided with apporpiate switches, thermostats, temperature indicating dials, and such related instruments as are required to control oprative conditions as to temperature, pressure, and the like, and provide visual indication thereof.

In operation, UHMW polymeric material is delivered to the hopper(s) either manually or through a continuous conveying system. Such material is in particulate (powder) form, must include a compatible lubricant and antioxidant, and is cooled to a temperature on the order of 65°F. This particulate material gravitates through the hopper 22 and into the precompression chamber 20 and the quantity of each charge thereof is determined by the diameters of the precompression chamber and the inlet thereto from the feed hopper.

Each forward storke of the ram 42 advances a charge of polymeric material and, on the return movement of the ram, a successive charge of such material gravitates into the precompression chamber in position for such advancement. As successive charges of polymeric material are compacted, delivered to the preheating chamber, and advanced therethrough, there is a continuous increase in compressive force and build up of resistance. With increase in temperature (to an optimum of 420°F. ), the softening point of the UHMW polymeric particulate material will be reached and, by reason of the back pressure created, the extrudate becomes a homogeneous mass having putty-like characteristics, with a complete bond having been created between individual particles. To further insure the complete homogenization of the extrudate, a spider-type spreader 51 is mounted within the bore 26 of the preheating chamber. This spreader may be in the form of a pair of diametrically disposed relatively thin elongated blades 52 and, preferably, the leading edge of each blade 52 is machined to a sharp edge 52a which functions to split the stream of moving extrudate and therey avoid the creation of adverse frictional influences. Desirably a pair of such spreaders is employed. These, it will be understood are received within the preheating chamber 26, positioned in tandem, with the blades of one spreader offset at an angle approximating 45° with respect to those of the other spreader. Spot welding, or comparable techniques, are employed to retain the pair of spreaders in assembled relationship as a unitary element.

Distance of travel of the extrudate and dwell time within the precompression and preheating chambers and die are critical. This is especially true in the light of the fact that the UHMW polymeric materials with which we here are concerned are particularly sensitive to both shear and temperature with degradation occurring at a temperature of 500°F. Applicant has discovered that ram pressure on the order of 50,000 p.s.i. is required, with a rate of ram reciprocation of three strokes per minute and a ram movement of 3½ inches. Under optimum operative conditions, with the length of the preheating chamber approximating 6 inches and the length of the die, from the entrance manifold to the discharge orifice, approximating 22, inches the longitudinal dimension of each of the spreaders will be 2 15/16 inches. Under these conditions, with the dimension (diameter) of the preheating chamber having a ratio of 3:1 to that of the profile of the extruded product, there will be a dwell time of the extrudate within the preheating chamber at a of 420°F of 3 minutes to insure the formation of a homogeneous mass and the linear rate of extrusion will be 5 inches per minute.

The present apparatus (and process) will lend itself with equal facility to the production of extrusion profiles of widely differing characteristics. The end products have a marble-like appearance, complete rigidity, and the ability to withstand exessive pressures without deformation. Other unexpected qualities include the ability to provide far greater resistance to wear, when in use, than comparable metallic lengths. This is separate and apart from such important commerical issues as ease and economy of production in continuous lengths and lightness in wieght when compared with such metals as are appropriate for use under working conditions which include extreme frictional influences.

As illustrative of specific profiles having exceptional degrees of commerical utility, three such extrusions, and die structures, are shown in FIGS. 6, 7, and 8 of the drawings. The rail structure of FIG. 6 is particularly suitable for use on moving vehicles, such as snowmobiles or the like, where a particularly high degree of resistance to wear through frictional influences is essential.

The skid structure shown in FIG. 7 has multiple uses such as in the handling/movement of heavy articles, boat handling - whether in the simple flaoting of a small boat from a trailer or the launching of large vessels, etc.

The tubular structure illustrated in FIG. 8 is particularly novel. Such a profile may be cut into appropriate lengths and utilized as bearings, rollers for conveyors or other related purposes, etc. Further, such a tubular extrusion may be machined with particular facility where close tolerances are required or (for example) to provide a bearing having a specifically conformed hub or other portion.

It will be obvious to those skilled in this art that various changes may be made in the invention without departing from the spirit and scope thereof. Thus, the invention is not considered limited by that which is shown in the drawings and described in the Specification and reference is had to the Claims for summaries of the essentials of the invention, novel features of constructions, and novel methods or operation, for all of which protection is desired.

I claim:

1. Apparatus for the extrusion of a continuous length of ultra high molecular weight polyethylene, said apparatus including a precompression chamber; means for delivering successive charges of particulate ultra high molecular weight polyethylene to said precompression chamber; a preheating chamber connected to said precompression chamber in axial alignment therewith, the diameter of said preheating chamber being substantially identical to that of said precompression chamber; heating means for maintaining the temperature in said preheating chamber at predetermined level; an elengated die connected to said preheating chamber in axial alignment therewith, said die having an elongated passageway provided with a tapered inlet portion adjacent one end thereof and a discharge orifice adjacent the other end thereof extending therethrough, said tapered inlet portion increasing substantially in diameter from a profile complementary to that of said elongated passageway to a size complementary to that of said preheating chamber; the transverse area relationship between the diameter of the preheating chamber and the profile of the elongated die passageway being on the order of 3:1 temperature control means extending substantially the entire length of said die for creating a predetermined maximum temperature at the die inlet for insuring the formation of a homogeneous mass and gradually reducing to a lower level as the extrusion exits from said discharge orifice; and reciprocable ram means mounted in axial alignment with said precompression chamber for successively compacting and advancing charges of particulate ultra high molecular weight polyethylene through said preheating chamber and into said die passageway.

2. Extrusion apparatus as set forth in claim 1, where longitudinally extending spreader means is mounted within the preheating chamber to insure the complete homogenization of the particulate thermoplastic material as it is advanced through said preheating chamber.

3. Extrusion apparatus as set forth in claim 2 where said spreader means is constituted by at least one pair of diametrically disposed and relatively thin elongated blades, the leading edge of each blade being provided with a relatively sharp edge so as to split the moving stream of extrudate.

4. Extrusion apparatus as set forth in claim 1 where the temperature of the preheating chamber is maintained at a temperature on the order of 420°F.

5. Extrusion apparatus as set forth in claim 1 where the temperature of the die at the inlet end thereof is on the order of 420°F., the temperature in the die passageway is decreased gradually to 250°F., and the temperature of the die passageway is further decreased to 200°F. at the die orifice.

6. Apparatus for the extrusion of a continuous length of ultra high molecular weight thermoplastic material having a molecular weight of 2.5 million to 4.0 million, said apparatus including a first cylindrical member having a centrally located axial bore extending therethrough providing a precompression chamber, the upper surface of said first cylindrical member being provided with a vertically disposed passage providing communication with said precompression chamber adjacent the inlet extremity thereof whereby particles of ultra high molecular weight thermoplastic material may be delivered to said precompression chamber in metered quantities; and integral annular boss on the outer verical face of said first cylindrical member in surrounding relationship with respect to the outlet extremity of said precompression chamber; a second cylindrical member mounted in abutting relationship with respect to the outer face of said first cylindrical member, the adjacent face of said second cylindrical member being prorvided with a complementarily conformed annular recess for the reception of said annular boss and insuring axial alignment between said first and second cylindrical members; said second cylindrical member also being proovided with a centrally located axial bore extending therethrough providing a preheating chamber, the diameter of said preheating chamber being identical to that of said precompression chamber; heating means surrounding said second cylindrical member and extending the length thereof for maintaining the temperature in said preheating chamber at a predetermined level; an elongated die connected to said preheating chamber in axial alignment therewith, said die including an enlarged annular flange on the inner extremity thereof, said flange being provided with a centrally located annular recess for the reception of the outer extremity of said second cylindrical member, said die having an elongated passageway provided with a tapered inlet portion adjacent one end thereof and a discharge orifice adjacent the other end thereof extending therethrough, said tapered inlet portion increasing substantially in diameter from a profile complementary to that of said elongted passageway to a size complementary to that of said preheating chamber; the transverse area relationship between the diameter of the preheating chamber and the profile of the elongated die passageway being on the order of 3:1, temperature control means extending substantially the entire length of said die for creating a predetermined maximum temperatue at the die inlet for insuring the formation of a homogeneous mass and gradually reducing to a lower level as the extrusion exits from the die orifice; and reciprocable ram means mounted in axial alignment with said precompression chamber for successively compacting and advancing charges of particulate ultra high molecular weight thermoplastic material through said preheating chamber and into the die passageway.

7. Extrusion apparatus as set forth in claim 6 where longitudinally extending spreader means constituted by at least one pair of diameterically disposed and relatively thin elongated blades, the leading edge of each blade being provided with a relatively sharp edge so as to split the moving stream of extrudate, is mounted within the preheating chamber to insure the complete homogenization of the particulate thermoplastic material as it is advanced through said preheating chamber.

* * * * *